(12) United States Patent
Chibon et al.

(10) Patent No.: US 12,294,495 B2
(45) Date of Patent: May 6, 2025

(54) SELF-ORGANIZING NETWORK CONFIGURATION

(71) Applicant: RED HAT, INC., Raleigh, NC (US)

(72) Inventors: Pierre-Yves Chibon, Saint-Pol-de-Léon (FR); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 591 days.

(21) Appl. No.: 17/572,086

(22) Filed: Jan. 10, 2022

(65) Prior Publication Data

US 2023/0224219 A1 Jul. 13, 2023

(51) Int. Cl.
*H04L 41/0893* (2022.01)
*H04L 41/0816* (2022.01)
*H04L 41/0866* (2022.01)
*H04L 41/0894* (2022.01)
*H04L 41/12* (2022.01)

(52) U.S. Cl.
CPC ...... *H04L 41/0893* (2013.01); *H04L 41/0816* (2013.01); *H04L 41/0866* (2013.01); *H04L 41/0894* (2022.05); *H04L 41/12* (2013.01)

(58) Field of Classification Search
CPC . H04L 41/0893; H04L 41/12; H04L 41/0866; H04L 41/0894; H04L 41/0816
See application file for complete search history.

(56) References Cited

U.S. PATENT DOCUMENTS

| | | | |
|---|---|---|---|
| 7,970,871 B2 | 6/2011 | Ewing et al. | |
| 9,461,976 B1 | 10/2016 | Smith et al. | |
| 2016/0065653 A1 | 3/2016 | Chen et al. | |
| 2016/0072674 A1* | 3/2016 | Nolan | H04L 41/0816 709/221 |
| 2016/0173495 A1* | 6/2016 | Joo | H04L 63/1425 713/171 |
| 2017/0063644 A1* | 3/2017 | Prabhakaran | H04L 41/0894 |
| 2018/0183874 A1* | 6/2018 | Cook | H04L 41/145 |
| 2018/0208448 A1* | 7/2018 | Zimmerman | G06K 7/1413 |
| 2019/0215244 A1* | 7/2019 | Choi | H04L 41/0853 |
| 2019/0230462 A1* | 7/2019 | McLarty | H04L 67/12 |
| 2020/0235994 A1 | 7/2020 | Rusev et al. | |
| 2021/0152434 A1 | 5/2021 | Chamarajnager et al. | |
| 2022/0150154 A1* | 5/2022 | Pethe | H04L 45/02 |

OTHER PUBLICATIONS

Vögler, M. et al. (Mar. 2016). "A Scalable Framework for Provisioning Large-Scale IoT Deployments," ACM Transactions on Internet Technology, 16(2)(11)11:1-11:20.

"Understand IoT Edge Automatic Deployments for Single Devices or at Scale," (Jan. 30, 2020), pp. 10.

* cited by examiner

*Primary Examiner* — Yemane Mesfin
*Assistant Examiner* — Salma Ayad
(74) *Attorney, Agent, or Firm* — Womble Bond Dickinson (US) LLP

(57) ABSTRACT

A status communication is received that is associated with a mesh network comprising a plurality of interconnected node devices. Responsive to the status communication, it is determined whether a configuration policy of the mesh network has been violated. Responsive to a determination that the configuration policy of the mesh network has been violated, a configuration communication comprising an updated configuration is transmitted by a processing device to a first node device of the plurality of node devices to modify the first node device from performing a first service within the mesh network to performing a second service.

20 Claims, 5 Drawing Sheets

SELF-ORGANIZING NETWORK CONFIGURATION

TECHNICAL FIELD

Aspects of the present disclosure relate to networked devices, and more particularly, to automatic configuration of members of a mesh network.

BACKGROUND

A mesh network is a network topology that includes nodes (i.e. bridges, switches, internet-of-things (IoT) devices, and other infrastructure devices) that are interconnected directly and non-hierarchically to other nodes and interact to communicate within the mesh. The interconnected format of the nodes allows for multiple nodes to participate in the relay of information.

Mesh networks may be formed from multiple types of devices, including nanotechnology, or nanotech, devices. Nanotech is an emerging technology that includes devices on a miniature scale, including atomic, molecular, and supramolecular scale. For example, nanotech devices may have a longest dimension that is less than 100 nm. The reduced size of such devices allows for a wide range of potential applications, including biological applications. Nanotech devices can be embedded into living cells and can control elements of cell function through protein synthesis and message passing. Large numbers of nanotech devices may be organized in a mesh network.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

Figure 1:
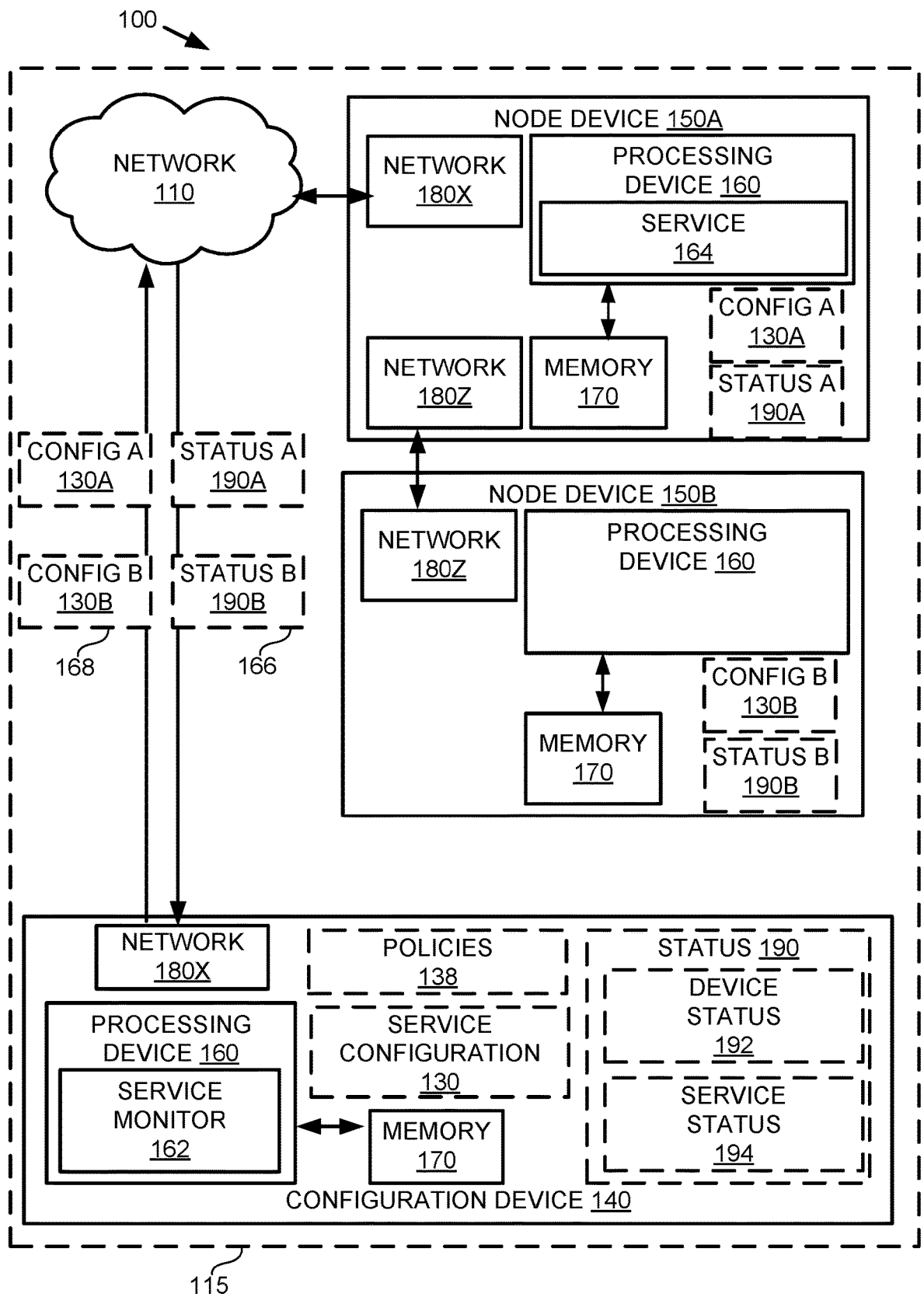
FIG. 1 is a block diagram that illustrates an example of a network architecture, in accordance with one or more aspects of the present disclosure.

Internet-of-things (IoT) devices have become increasingly ubiquitous and, as a result, various solutions have been proposed to communicate with and between large networks of IoT devices. IoT devices can have various types of software and/or hardware configurations. By networking the IoT devices together, functionalities performed by one of the IoT devices may be provided as a service to other IoT devices that lack that functionality. For example, some IoT devices may have a particular type of processing functionality (such as authentication or password management) that may be provided to other IoT devices in the network.

In a conventional IoT network, when the IoT network grows in size, configuring each device quickly becomes a challenging task. The proper configuration of the IoT devices may be needed to provide not only that the right software is installed, but that the right distribution of key services within the IoT network is also provided. Managing hundreds or thousands of node devices (which may be, for example, a network device) raises challenges of scalability as well as flexibility.

Aspects of the disclosure address the above-noted and other deficiencies by providing configuration management that is applied by distributing key services within the IoT network and modifying configurations of nodes of the IoT network when a configuration of the IoT network violates a monitored configuration policy. As described herein, a service monitor of a configuration device may monitor the mesh network to determine if key configuration policies have been violated. For example, the service monitor of the configuration device may monitor that a certain number of a first type of IoT node (e.g., an IoT node performing a particular service for the mesh network, such as providing download, authentication, and/or networking services) are present in a given quantity or proportion. If the service monitor determines that the configuration policy has been violated, it may reconfigure one or more IoT nodes in the IoT network to resolve the configuration policy violation. For example, the configuration management service may select one or more other nodes in the network to perform the missing (or lacking) service.

As compared to conventional devices, embodiments of the present disclosure allow for automatic adjustment within an IoT network to maintain a particular level of service and/or functionality. Embodiments of the present disclosure provide increased flexibility to the IoT network where devices may be added that are not of the same capability levels. As the IoT network grows it can self-organize to keep on satisfying the requirements set in in the configuration policy. The self-organization may be performed automatically such that the adjustments (which may expand or contract provided services) are accomplished without human intervention. Additionally, the configuration policy being monitored by the configuration management service may be altered over time, allowing the network to adjust itself at the next check of the requirements. As used herein, the term "and/or" includes any and all combinations of one or more of the associated listed items.

FIG. 1 depicts a high-level component diagram of an illustrative example of a mesh network architecture 100, in accordance with one or more aspects of the present disclosure. However, although the discussion with respect to FIG. 1 describes a mesh network, other network architectures (e.g., non-mesh) are possible without deviating from the scope of the present disclosure, and the implementation of a computer system utilizing examples of the disclosure are not necessarily limited to the specific architecture depicted by FIG. 1.

As shown in FIG. 1, mesh network architecture 100 includes a plurality of computing devices, including a configuration device 140 and a plurality of node devices 150. For convenience of description, only two node devices 150, a first node device 150A and a second node device 150B, are illustrated, but it will be understood that additional node devices 150 may be present without deviating from the scope of the present disclosure.

FIG. 1 and the other figures may use like reference numerals to identify like elements. A letter after a reference numeral, such as "150A," indicates that the text refers specifically to the element having that particular reference numeral. A reference numeral in the text without a following letter, such as "150," refers to any or all of the elements in the figures bearing that reference numeral.

The configuration device 140 and node devices 150 include one or more processing devices 160, memory 170, which may include volatile memory devices (e.g., random access memory (RAM)), non-volatile memory devices (e.g., flash memory) and/or other types of memory devices, and one or more network interfaces 180. In certain implementations, memory 170 may be non-uniform access (NUMA), such that memory access time depends on the memory location relative to processing device 160. It should be noted that although, for simplicity, a single processing device 160 is depicted in each of the configuration device 140 and node devices 150 depicted in FIG. 1, other embodiments of configuration device 140 and node devices 150 may include multiple processing devices, storage devices, or other devices.

Processing device 160 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 160 may also include one or more special-purpose processing devices such as an application specific integrated circuit (ASIC), a field programmable gate array (FPGA), a digital signal processor (DSP), network processor, or the like. Different ones of the configuration device 140 and node devices 150 may have different types of processing device 160.

The configuration device 140 and node devices 150 may be a server, a mainframe, a workstation, a personal computer (PC), a mobile phone, a palm-sized computing device, a virtual instance of a computing device, etc. In some embodiments, one or more of the configuration device 140 and node devices 150 may be an IoT device. In some embodiments, one or more of the configuration device 140 and node devices 150 may be a nanotech device. For clarity, some components of the configuration device 140 and node devices 150 are not shown.

In some embodiments, the configuration device 140 and the node devices 150 may be directly or indirectly communicatively coupled through one or more of the network interfaces. For example, the configuration device 140 and one or more of the node devices 150 may be coupled to each other (e.g., may be operatively coupled, communicatively coupled, may communicate data/messages with each other) via network 110. Network 110 may be a public network (e.g., the internet), a private network (e.g., a local area network (LAN) or wide area network (WAN)), or a combination thereof. In one embodiment, network 110 may include a wired or a wireless infrastructure, which may be provided by one or more wireless communications systems, such as a WIFI® hotspot connected with the network 110 and/or a wireless carrier system that can be implemented using various data processing equipment, communication towers (e.g., cell towers), etc. The network 110 may carry communications (e.g., data, message, packets, frames, etc.) between the various components of the configuration device 140 and one or more of the node devices 150. Though configuration device 140 is shown outside a perimeter of the network 110 in FIG. 1, this is only schematic and not intended to limit the embodiments of the present disclosure.

The configuration device 140 and the node devices 150 may include a plurality of network interfaces 180. The network interfaces 180 may communicate with a plurality of network types. The variety of network interfaces 180 may allow for various configurations of network connectivity between the configuration device 140 and the node devices 150.

For example, configuration device 140 may include a first network interface 180X. The first network interface 180X may communicate with and/or within the network 110. A first node device of the node devices 150, e.g., first node device 150A, may also include the first network interface 180X. Thus, the first node device 150A may be capable of communicating with the configuration device 140 over network 110 using the first network interface 180X.

A second node device of the node devices 150, e.g., second node device 150B, may not include the first network interface 180X. Thus, the second node device 150B may not be capable of directly communicating over network 110. Instead, the second node device 150B may be communicatively coupled to the network 110 through a second network interface 180Z that is coupled to the first node device 150A (e.g., as a point-to-point connection). That is to say that the first node device 150A may serve as a relay for communications between the second node device 150B and the network 110. For example, the second node device 150B may be capable of communicating with the configuration device 140 through the second network interface 180Z between the first and second node devices 150A, 150B and through the first network interface 180X between the first node device 150A and the configuration device 140 (over network 110). In some embodiments, the first and/or second network interface 180Z may include a wireless technology, such as WIFI®, Bluetooth, Home radio frequency (Home RF), to name a few examples.

The configuration device 140, the first node device 150A, the second node device 150B, and the network connections therebetween may form the mesh network 115. The mesh network 115 may provide an interconnected and non-hierarchical network between members of the mesh. Devices (e.g., node devices 150) may join or leave the mesh network 115, and communication between members of the mesh over various network connections of the mesh may be dynamically routed responsive to changes in the mesh configuration.

The node devices 150 may perform one or more services 164 within the mesh network 115. As used herein, a "service" provided by the node device 150 refers to a task or other technical activity performed by the node device 150 on behalf of or for another node device. A service may include computer program logic utilized to provide the specified task or technical activity. Thus, a service can be implemented in hardware, firmware, and/or software. In one embodiment, services are stored on a non-transitory storage device (i.e., a computer program product), loaded into a memory, and executed by one or more processing devices. In some embodiments, the service 164 may be provided by execution of computer instruction code on processing device 160. Examples of services 164 include, but are not limited to, an authentication service, a storage service, a gateway service, a processing service, a power management service, and/or a packaging service.

As an example, an authentication service may include a node device 150 (e.g., first node device 150A) that provides cryptographic and/or password services to other node devices 150 (e.g., second node device 150B). For example, the authentication service may include the node device 150 receiving a transmission (e.g., over mesh network 115) that includes a password and/or a hash value of a password that are associated with a set of credentials. The authentication service may authenticate the password and/or the hash value with respect to the credentials. The process of authentication may include the authentication service communicating with another network entity (e.g., another node device 150 or a server outside of the mesh network 115) to authenticate the credentials. In some embodiments, the authentication service may include providing cryptographic and/or security functions to other node devices 150. A node device 150 providing an authentication service may include additional storage to provide credential information and/or additional processing capability to perform cryptographic functions, for example.

As another example, a storage service may include a node device 150 (e.g., first node device 150A) that provides non-volatile and/or volatile storage to other node devices 150 (e.g., second node device 150B). For example, the storage service may include the node device 150 receiving a transmission (e.g., over mesh network 115) that includes data to be stored or retrieved. The authentication service may store the data within the node device 150 in response to the storage communication and may provide stored data in response to a retrieval communication. A node device 150 providing a storage service may include excess storage capacity in the form of disk and/or memory, for example.

As another example, a gateway service may include a node device 150 (e.g., first node device 150A) that serves as a network gateway to other node devices 150 (e.g., second node device 150B). For example, the gate service may include the node device 150 receiving a transmission (e.g., over mesh network 115) that includes a network transmission on a first network interface to be provided to or by way of a second network interface or network topology. Referring to FIG. 1, in an example in which the first node device 150A provides a gateway service, the first node device 150A may receive a network communication from the second node device 150B on the second network interface 180Z. The first node device 150A may, by way of the gateway service 164, provide the network communication on the first network interface 180X to network 110. Thus, the network communication from the second node device 150B may be passed to the network 110. It will be understood that other network functionalities, such as routing, network firewalls, virtual private networks, and the like may be provided by the gateway service without deviating from the embodiments of the present disclosure. For example, a node device 150 providing a gateway service may include multiple network interfaces (e.g., WIFI, Bluetooth network interfaces).

As another example, a processing service may include a node device 150 (e.g., first node device 150A) that provides additional processing capabilities to other node devices 150 (e.g., second node device 150B). For example, the processing service may include the node device 150 receiving a transmission (e.g., over mesh network 115) that includes data to be processed or calculated. The processing service may perform the calculations and provide the result via a return network transmission. A node device 150 providing a processing service may include additional or excess processing capability (e.g., larger processors and/or GPUs), for example.

As another example, a power management service may include a node device 150 (e.g., first node device 150A) that provides wireless or direct power to other node devices 150 (e.g., second node device 150B). For example, the power management service may include the node device 150 providing power (e.g., electricity) to other node devices 150 that may directly or wirelessly couple to it. For example, a node device 150 providing a power management service may include features for power storage, such as a battery, and/or mechanisms for power coupling, such as wireless power transfer.

As another example, a packaging service may include a node device 150 (e.g., first node device 150A) that provides software updates and/or packages to other node devices 150 (e.g., second node device 150B). For example, the packaging service may include the node device 150 receiving a transmission (e.g., over mesh network 115) that includes a request for software or an indication of a current package level on another node device 150. The packaging service may provide one or more packages to the requesting node device 150 for download. For example, if the packaging service determines that a particular version of a package on the requesting node device 150 is not the most current version, the packaging service may provide an updated copy of the package to the requesting node device 150 (or make the updated copy available for download). A node device 150 providing a packaging service may include excess storage capacity in the form of disk and/or memory, for example.

The above examples of services 164 are merely examples, and are not intended to limit the present disclosure. One of ordinary skill in the art will recognize that other types of services 164 may be provided within the mesh network 115 without deviating from embodiments of the present disclosure. For example, in some embodiments of the present disclosure, services 164 may be provided for any type of specialized hardware and/or software present on the node device 150 that may be utilized to provide functionality to other node devices 150 of the mesh network 115.

A service monitor 162 of the configuration device 140 may keep track of the status 190 of each of the node devices 150. The status 190 may include multiple characteristics for each of the node devices 150. For example, the status 190 may include device status 192 and service status 194.

The device status 192 may include, for each node device 150, an inventory of the node device 150 and/or a current performance of the node device 150. The inventory of the node devices 150 provided in the status 190 may include, for example, a number of processors on or accessible by the node device 150, an amount of memory on or accessible by the node device 150, an amount of storage on or accessible by the node device 150, a number and type of network interfaces on or accessible by the node device 150, sensors on or accessible by the node device 150, a physical location of the node device 150 (e.g., as determined by a GPS sensor), a network location of the node device 150 (e.g., an IP address) etc. The current performance of the node devices 150 provided in the status 190 may include, for example, a processing load being processed by the node device 150, an amount of free memory and/or storage on the node device 150, a network capacity of the node device 150, etc.

The service status 194 may include, for each node device 150, one or more services 164 being provided within the mesh network 115. It will be understood that not all node devices 150 may be executing a service 164 within the mesh network 115. Some node devices 150 may instead be unconfigured (or performing other tasks) rather than providing a service 164. FIG. 1 illustrates an example in which the first node device 150A is providing a service 164 but the second node device 150B is not.

The service monitor 162 of the configurations device 140 may receive one or more status communications 166 (also referred to as a status event or status transmission) from each of the node devices 150. For example, the configuration device 140 may receive a first status communication 166 from the first node device 150A containing a first status 190A and a second status communication 166 from the second node device 150B containing a second status 190B. The first status 190A may indicate an inventory of the first node device 150A, a current performance of the first node device 150A, and/or any services 164 running on the first node device 150A (if present). Similarly, the second status 190B may indicate an inventory of the second node device 150B, a current performance of the second node device 150B and any services 164 running on the second node device 150B (if present).

The service monitor 162 may receive the status communications 166 from reach of the node devices 150 and place the contents of the status communications 166 into a repository of status 190 on the configuration device 140 (e.g., as a device status 192 and/or a service status 194). In some embodiments, the status communications 166 are provided by an application executing on the node device 150. In some embodiments, the status communications may be provided on a regular basis (e.g., on a regular interval) and/or when an updated status 190 is available on the node device 150 (e.g., event-driven).

It will be understood that the various status communications 166 may include a status 190 that may be the same or different format. For example, in some embodiments, the first node device 150A may send its inventory as part of a first status 190A in a status communication 166 but may omit the inventory information from subsequent status communications 166 unless the inventory has changed. Similarly, though the statuses 190A, 190B are illustrated as being provided from the node devices 150 in FIG. 1, it will be understood that this is merely an example. In some embodiments, the configuration device 140 may poll the various node devices 150 in order to get the status information 190.

The configuration device 140 may provide one or more service configuration communications 168 (also referred to herein as a service event or configuration communication) to one or more of the node devices 150. The configuration communications 168 may include a service configuration 130 to be applied to the node devices 150. The service configuration 130 may include a designation of which services 164 are to be run on which node devices 150 within the mesh network 115. For example, the service configuration 130 may designate that a particular node device 150 run a particular service 164, or run no service 164 (e.g., provide no services to the mesh network 115). The configuration device 140 may provide an updated configuration 130 utilizing the configuration communications 168. For example, the configuration device 140 may transmit a first configuration communication 168 containing a first service configuration 130A to the first node device 150A, and send a second configuration communication 168 containing a second service configuration 130B to the second node device 150B.

The service configuration 130 may establish which service 164 a node device 150 is to run. In some embodiments, if the node device 150 receives a service configuration 130 that indicates a service 164 that is different from that being currently run, the node device 150 will switch to executing the newly indicated service 164. As a non-limiting example, the first node device 150A may be executing a service 164 that provides an authentication service 164 to the mesh network 115. The configuration device 140 may transmit a configuration communication 168 containing the first service configuration 130 indicating a processing service 164. As a result, the first node device 150A may cease executing the authentication service 164 and begin executing a processing service 164.

In some embodiments, in order to transition a node device 150 from executing a first service 164 to a second service 164, the node device 150 may need additional provisioning (e.g., may need additional executable files, configuration files, or the like). In some embodiments, the configuration device 140 may provide the node device 150 with the files, or a link/location of the files, that the node device 150 may utilize to execute the second service 164. For example, the configuration communication 168 may include information for the node device 150 to access files needed for a service 164 included in the configuration communication 168. In some embodiments, the node device 150 may be pre-configured to run one or more services 164 such that additional provisioning is not needed in every instance.

The configuration device 140 may transmit the updated service configurations 130 based on a comparison of the capabilities of the mesh network 115 with a set of policies 138. The policies 138 may establish minimum (or maximum) of a quantity of node devices performing a service 164 and/or levels of performance of the various services 164 provided in the mesh network 115.

In some embodiments, the policies 138 may indicate that a minimum number of node devices 150 executing a particular type of service 164 should be present within the mesh network 115. For example, the policies 138 may indicate that at least one authentication service 164 shall be present within the mesh network 115. If, through analysis of the status 190 of the mesh network 115, the configuration device 140 determines that such a configuration policy 138 is violated (e.g., no authentication service 164 is running), the configuration device 140 may transmit an updated service configurations 130 to one or more node devices 150 specifying that the one or more node devices 150 shall execute an authentication service 164. Upon receiving such a service configuration 130, a node device shall switch from a currently executing service 164 to the authentication service 164, or transition from not offering a service 164 to executing the authentication service 164.

In some embodiments, the service configuration 130 may be selected based on the status 190 for the mesh network 115. For example, the configuration device 140 may analyze a device status 192 to determine which of the node devices 150 are capable of (e.g., have the requisite software and/or hardware) to execute the needed service 164. In some embodiments, the configuration device 140 may also consult the service status 194 to determine which node devices 150 are already running services 164 to determine a preferred node device 150 to execute the updated service 164. For example, the configuration device 140 may first attempt to find a node device 150 that is capable of executing the service 164 and is not currently executing any other service 164. It will be understood that other methods for selecting a target node device 150 are possible without deviating from the present disclosure.

Though the above example focused on a policy 138 that specified a minimum number of executing services 164, this is merely an example. Other policies 138 that may trigger a configuration change on a node device include, but are not limited to: a maintained ratio of a particular service 164 for a given number of node devices 150 (e.g., a policy 138 may specify that at least X % of the node devices 150 provide a download service 164), at least one provider of a service 164 (e.g., a power management service) in proximity to a subset of node devices 150, a threshold performance level of a given node device 150 (e.g., the configuration device 140 may determine that a performance of a node device 150 had dropped below acceptable levels, and may designate another node device 150 to additionally or alternatively provide the service 164 being executed by the poorly-performing node device 150), as well as other types of triggers that may justify an expansion or contraction of services within the mesh network 115.

In some embodiments, the configuration device 140 may initiate an analysis of whether the present status 190 matches the policies 138 at various triggers. For example, the configuration device 140 may reexamine the compliance of the mesh network 115 with the policies 138 upon detection that a node device 150 has left or entered the mesh network 115. In some embodiments, the configuration device 140 may reexamine the compliance of the mesh network 115 with the policies 138 upon detection that a performance of one or more of the node devices 150 has dropped below a threshold level (e.g., the node device 150 has failed or is under an unacceptable load). In some embodiments, the configuration device 140 may reexamine the compliance of the mesh network 115 with the policies 138 upon detection that a node device 150 is still within the mesh network 115, but has physically moved.

Figure 2:
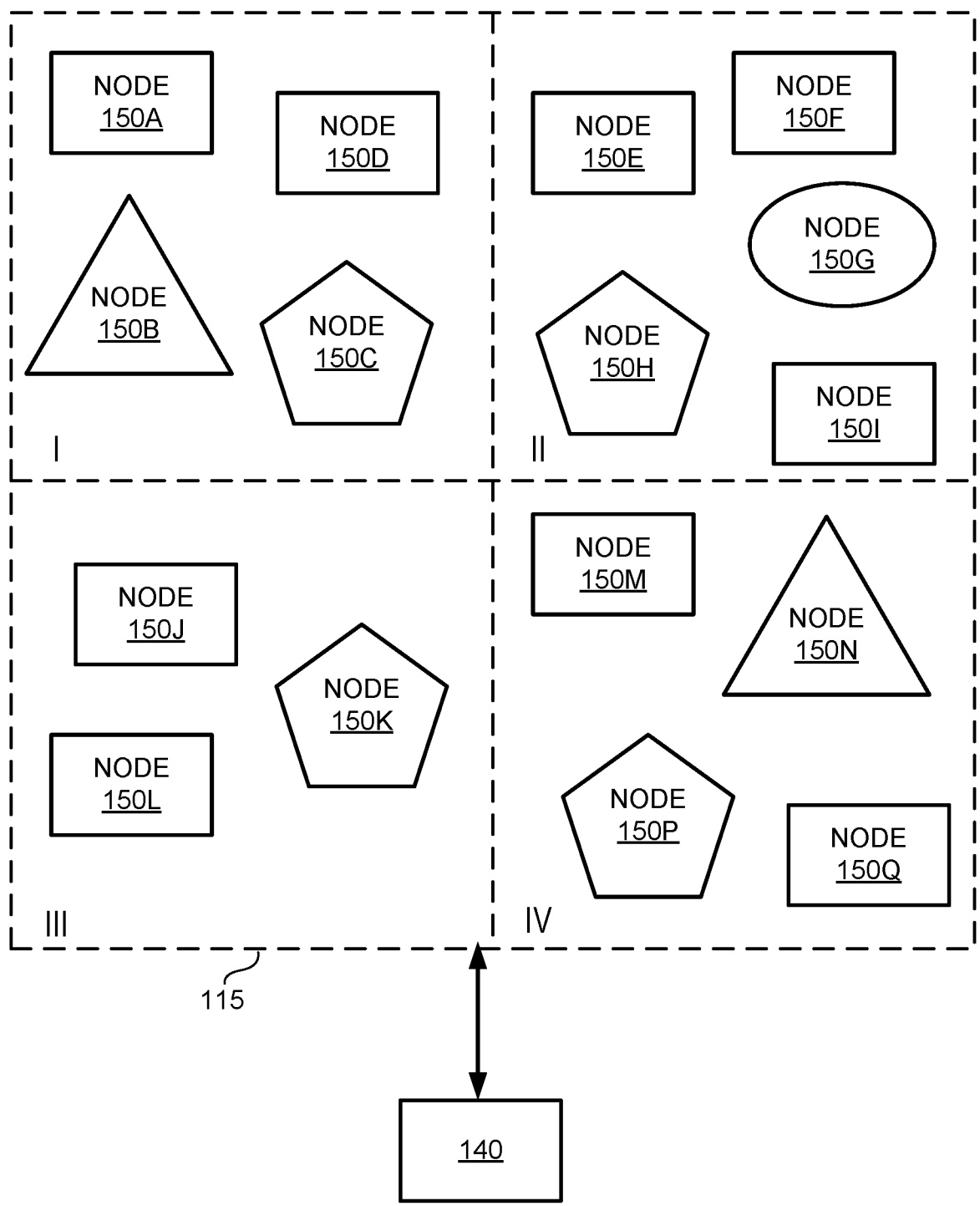
FIG. 2 is a schematic diagram illustrating an example scenario of service monitoring based on proximity and/or location, in accordance with one or more aspects of the present disclosure.

FIG. 2 is a schematic diagram illustrating an example scenario of service monitoring based on proximity and/or location, in accordance with one or more aspects of the present disclosure. In FIG. 2, a configuration device 140 is illustrated in communication with a mesh network 115. The mesh network 115 may be organized in a plurality of segments, which are illustrated schematically as segments I, II, III, and IV in FIG. 2. The number and placement of the segments I-IV in FIG. 2 are merely an example, and more or fewer segments I-IV may be provided without deviating from the embodiments of the present disclosure. In addition, the segments I-IV are illustrated as having a uniform shape in FIG. 2. This is merely an example, and segments I-IV of different sizes may be present without deviation from the embodiments of the present disclosure.

Referring to FIGS. 1 and 2, a plurality of node devices 150 may be interconnected and/or grouped within the segments I-IV of the mesh network 115. For example, as illustrated in FIG. 2, a first segment I may include node devices 150A, 150B, 150C, and 150D. A second segment II may include node devices 150E, 150F, 150G, 150H, and 150I. A third segment III may include node devices 150J, 150K, and 150L. A fourth segment IV may include node devices 150M, 150N, 150P, and 150Q. The segments I-IV may represent a physical grouping of node devices 150 (e.g., within a particular geographic area or within a certain proximity to one another) or a logical grouping of node devices 150 (e.g., node devices 150 performing a particular function or other categorization).

As described herein, the plurality of node devices 150 may be coupled directly and/or indirectly within the mesh network 115. The plurality of node devices 150 may each include one or more network interfaces (e.g., network interfaces 180 in FIG. 1). In FIG. 2, one or more of the node devices 150 may be running a service 164 (see FIG. 1). In FIG. 2, different shapes for the node devices 150 are utilized to illustrate different types of services 164. This illustration of the service 164 is merely schematic and is not intended to limit the embodiments of the present disclosure.

In some embodiments, the configuration device 140 may execute a service monitor 162 (see FIG. 1) that monitors and maintains a service configuration of the node devices against a set of policies 138 (see FIG. 1). In some embodiments, the policies 138 may apply to the entire mesh network 115 and/or one or more of the segments I-V. For example, one of the policies 138 may indicate that at least X % (where X is a natural number) of the node devices 150 within the mesh network 115 should operate a particular service 164 (e.g., a download service) and that at least one node device 150 (or other number of node devices 150) executing the service 164 shall be present in each of the segments I-IV.

Such a policy 138 may ensure that particular services 164 are distributed throughout the mesh network 115. Thus, the configuration device 140 may monitor the movement of node devices 150 throughout the mesh network 115 (e.g., tracking a movement of a node device 150 from, e.g., segment I to segment III). If the configuration device 140 determines that the mesh network 115 and/or one or more of the segments I-IV of the mesh network 115 does not match the policy 138 for the services, a configuration communication 168 (see FIG. 1) may be sent to one or more of the node devices 150 in the mesh network 115 to start, stop, and/or modify an execution of a service 164 on the node device 150, as described herein with respect to FIG. 1.

In some embodiments, the configuration device 140 may also monitor proximity of the execution of services 164 with respect to node devices 150 within the mesh network 115 and/or segments I-IV. For example, the configuration device 140 may monitor a policy 138 that maintains a certain service 164 be available within a certain distance of other node devices 150 of the mesh network 115. For example, the configuration device 140 may determine that at least one storage service 164 should be executing within a certain distance of one or more of the node devices 150 of the mesh network 115. Upon determining that this policy 138 is not met (e.g., because of physical movement of the node devices 150), the configuration device 140 may re-task one or more node devices 150 to execute the storage service 164 such that this policy 138 may be maintained. In some embodiments, the configuration device 140 may determine the location of the node devices 150 via the status communications 166 (see FIG. 1) from the node devices 150. In some embodiments, the configuration device 140 may be able to physically track the node devices 150.

Figure 3:
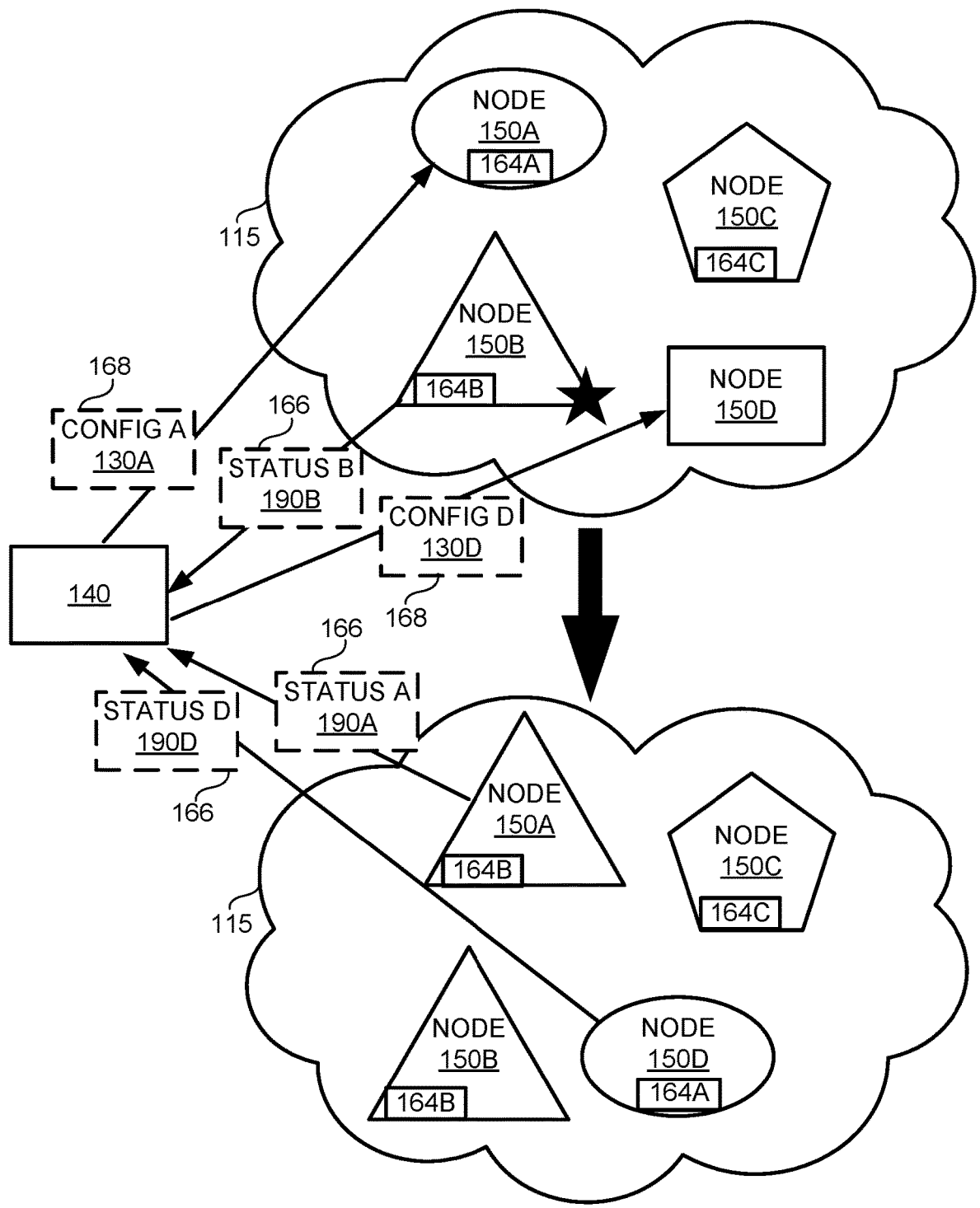
FIG. 3 depicts a high-level schematic diagram of an illustrative example of the modification of a service within a mesh network, in accordance with one or more aspects of the present disclosure.

FIG. 3 depicts a high-level schematic diagram of an illustrative example of the modification of a service 164 within a mesh network 115, in accordance with one or more aspects of the present disclosure. In FIG. 3, a configuration device 140 is illustrated in communication with a mesh network 115 including a plurality of node devices 150. This is merely an example configuration and is not intended to limit the embodiments of the present disclosure. In FIG. 3, one or more of the node devices 150 may be running a service 164 (see FIG. 1). In FIG. 3, different shapes for the node devices 150 are utilized to illustrate different types of services 164. This arrangement of the service 164 is merely schematic and is not intended to limit the embodiments of the present disclosure. FIG. 3 illustrates, in part, a transition of the network from a first mesh network configuration (in the upper part of the figure) to a second mesh network (in the lower part of the figure) in response to changes within the node devices 150.

Referring to FIG. 3, the configuration device 140 may monitor the mesh network 115 (e.g., by way of service monitor 162 illustrated in FIG. 1). The mesh network 115 may include a first node device 150A (executing a service 164A), a second node device 150B (executing a service 164B), a third node device 150C, and a fourth node device 150D (executing a service 164D).

In FIG. 3, a star is indicated next to the second node device 150B to indicate that the second node device 150B has experienced a change in status. For example, the second node device 150B may enter or leave the mesh network 115. As another example, a performance of the second node device 150B may degrade below a threshold value. In some embodiments, the second node device 150B may be executing a service 164B and/or providing the service 164B to the mesh network 115.

In response to the change in status, the second node device 150B may provide a status communication 166 to the configuration device 140 that contains an updated status 190B for the second node device 150B. In some embodiments, the updated status 190B may be provided by an application executing on a processing device of the second node device 150B. For example, the application executing on the processing device of the second node device 150B may register or otherwise connect itself to the mesh network 115 (e.g., resulting in a node entry updated status), may deregister or otherwise leave the mesh network 115 (e.g., resulting in a node exit updated status), and/or analyze the current performance (e.g., CPU utilization, memory usage, storage availability, etc.) to identify that the node device 150 is under load.

In some embodiments, the configuration device 140 may determine the change in status through other means. For example, the configuration device 140 may regularly poll the node devices 150. In some embodiments, the configuration device 140 may determine that a node device 150 has left the mesh network 115 by determining that a poll to the node device 150 has not been responded to and/or by determining that a status communication 166 has not been received from the node device 150 within a regular time duration.

In response to the status communication 166 and/or a failure to receive a status communication 166 within a timely manner, the configuration device 140 may analyze the configuration of the mesh network 115 to determine whether the policy 138 of the mesh network 115 has been violated. For example, the second node device 150B may have entered (or left) the mesh network 115 and a ratio of provided services may no longer be within a range provided by the policy 138. As another example, a performance of the second node device 150B may have degraded, and a service 164B (e.g., a processing service) provided by the second node device 150B may no longer meet a threshold performance. As a result, the configuration device 140 may determine that a change to the service configuration of the mesh network 115 is warranted.

The configuration device 140 may determine, for example, that the first node device 150A should alter its configuration and provide a same service 164B that is being provided by the second node device 150B. That is to say that the configuration device 140 may determine that the first node device 150A should stop executing its current service 164A (e.g., a power management service) and begin executing a new service 164B (e.g., a processing service). The configuration device 140 may make this determination, for example, based on an inventory of the capabilities and/or location of the first node device 150A. For example, the configuration device 140 may analyze the status 190 (see FIG. 1) received from the first node device 150A to determine the current status of the first node device 150A. The configuration device 140 may maintain a set of requirements (e.g., available storage, available memory, types of network interfaces, amount/speed of processing devices, etc.) that are associated with each of the services 164. The configuration device 140 may determine that the first node device 150A is capable of executing the new service 164B.

To provide an alteration to the configuration of the first node device 150A, the configuration device 140 may transmit a configuration communication 168 that includes a service configuration 130A to the first node device 150A. The service configuration 130A may indicate that the first node device 150A is to transition to executing the newly identified service 164B.

As an additional example, the configuration device 140 may examine whether the proposed change to the functionality of the first node device 150A would cause a violation of one or more policies 138 of the mesh network 115. The configuration device 140 may determine that the fourth node device 150D should being executing the service 164A previously provided by the first node device 150A (e.g., a power management service). In some embodiments, the fourth node device 150D may be an "spare" and/or unconfigured node device 150. For example, the fourth node device 150D may not currently be providing a service 164 to the mesh network 115. Thus, the fourth node device 150D may transition from not providing a service 164 to providing a service 164A. The configuration device 140 may make this determination, for example, based on an inventory of the capabilities and/or location of the fourth node device 150D. For example, the configuration device 140 may analyze the status 190 (see FIG. 1) received from the fourth node device 150D to determine the current status of the fourth node device 150D.

To provide an alteration to the configuration of the fourth node device 150D, the configuration device 140 may transmit a configuration communication 168 that includes a service configuration 130D to the fourth node device 150D. The service configuration 130D may indicate that the fourth node device 150D is to transition to executing the service 164A previously executed by the first node device 150A.

As a result of the configuration communications 168, a service configuration of the mesh network 115 may shift, as illustrated by the lower mesh network 115 in FIG. 3. As illustrated in FIG. 3, the first node device 150A may transition from executing a first service 164A to executing a same service 164B as the second node device 150B. In addition, the fourth node device 150D may transition to executing the first service 164A that was previously being executed by the first node device 150A. In response to the transition, each of the first and fourth node devices 150A, 150D may provide an updated status 190 to the configuration device 140. For example, the first node device 150A may provide a status communication 166 containing updated status 190A to the configuration device 140 and the fourth node device 150D may provide a status communication 166 containing updated status 190D to the configuration device 140. The configuration device 140 may analyze the received statuses 190A, 190D to determine if the policy 138 of the mesh network 115 is now met. Responsive to determining that the policy 138 of the mesh network 115 is no longer violated, the configuration device 140 may continue its monitoring with no additional actions.

The configuration and transition illustrated in FIG. 3 is merely an example, and other types of configuration changes are possible without deviating from the scope of the present disclosure. For example, in some embodiments, rather than indicating that a node device 150 should begin executing a service 164 or change the service 164 that is being executed, the configuration device 140 may indicate to a node device 150 that it should cease providing a service 164 to the mesh network 115. This may happen, for example, to save power within the mesh network 115 and/or provide additional "spare" node devices 150 to increase the potential capabilities of the mesh network 115.

Though FIG. 3 illustrates an example where the node devices 150 execute a single service 164 such that beginning one service 164 implies the ceasing of the currently-executing service 164, this is only an example and not intended to limit the embodiments of the present disclosure. In some embodiments, the node device 150 may be capable of providing a plurality of services 164, and the configuration device 140 may request that a node device 150 executes a new service 164 in addition to the currently executing service 164 (such that the node device 150 is providing a plurality of services 164 to the mesh network 115).

Figure 4:
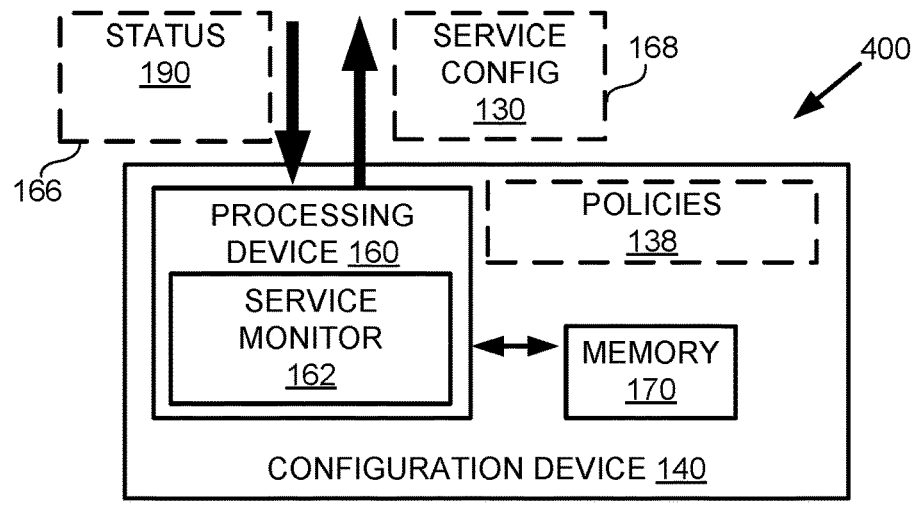
FIG. 4 is a component diagram of an example of a device architecture, in accordance with one or more aspects of the disclosure.

FIG. 4 is a component diagram of an example of a device architecture 400, in accordance with one or more aspects of the disclosure. The device architecture 400 includes configuration device 140, processing device 160, and memory 170 of FIG. 1 and, as such, a duplicate description thereof will be omitted.

The configuration device 140 may receive a status communication 166 containing a status 190 from one or more node devices 150, such as the status 190 and the node devices 150 described herein with respect to FIGS. 1-3. The configuration device may compare, e.g., by the processing device 160, the received status 190 to one or more policies 138 for a mesh network 115. The configuration device 140 may further provide a configuration communication 168 including an updated configuration 130 indicating a change to be performed with respect to a service 164 being executed by one or more of the node devices 150 of the mesh network 115. It should be noted that the status communication 166, the status 190, the configuration communication 168, the updated configuration 130, and the policies 138 are shown for illustrative purposes only and are not physical components of configuration device 140.

Configuration device 140 may include a memory 170 that is operatively coupled to processing device 160. In embodiments, memory 170 may include volatile memory devices (e.g., random access memory (RAM)), non-volatile memory devices (e.g., flash memory) and/or other types of memory devices.

Figure 5:
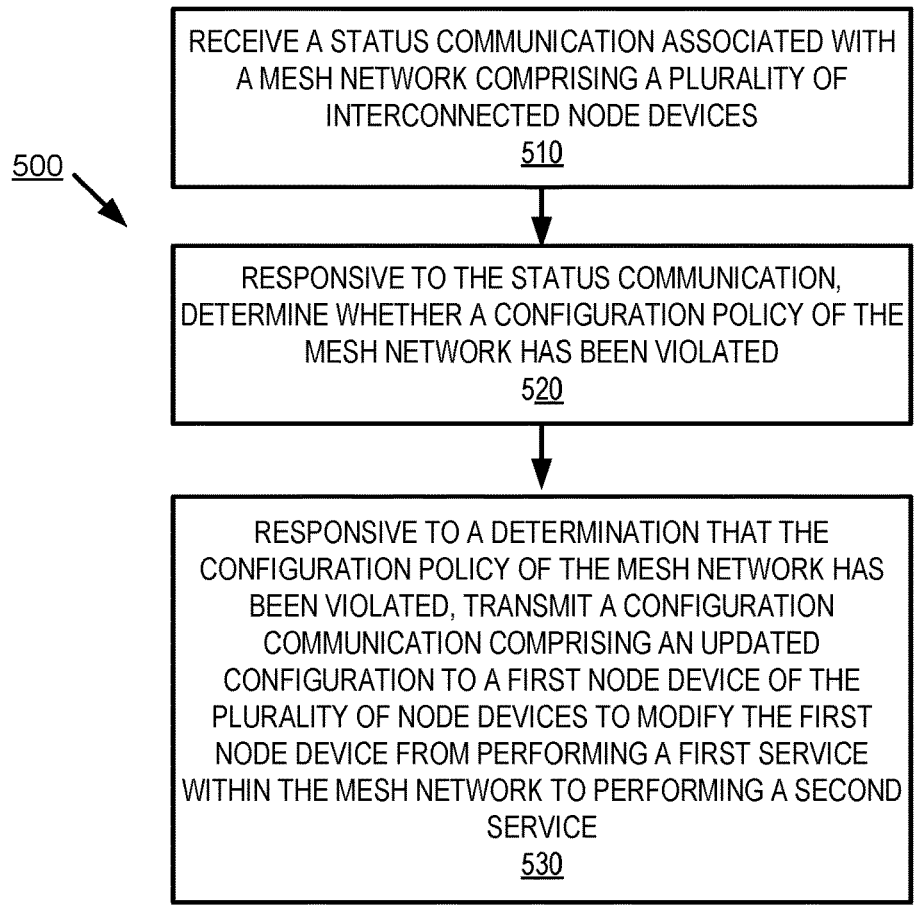
FIG. 5 is a flow diagram of a method of monitoring a service configuration of a mesh network, in accordance with one or more aspects of the disclosure.

FIG. 5 is a flow diagram of a method 500 of monitoring a service configuration of a mesh network 115, in accordance with one or more aspects of the disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by configuration device 140, service monitor 162, and/or the node device 150 of at least FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic receives a status communication associated with a mesh network comprising a plurality of interconnected node devices. The status communication may be, for example, similar to the status communication 166 including status 190 discussed herein with respect to FIGS. 1-4.

At block 520, the processing logic, responsive to the status communication, determines whether a configuration policy of the mesh network has been violated. The status configuration policy may be, for example, similar to the policy 138 discussed herein with respect to FIGS. 1-4. In some embodiments, the configuration policy may indicate a level and/or amount of one or more services that are to be provided within the mesh network.

At block 530, the processing logic, responsive to a determination that the configuration policy of the mesh network has been violated, transmits a configuration communication comprising an updated configuration to a first node device of the plurality of node devices to modify the first node device from performing a first service within the mesh network to performing a second service. The configuration communication may be, for example, similar to the configuration communication 168 including service configuration 130 discussed herein with respect to FIGS. 1-4. The node device and first/second services may be, for example, similar to the node device 150 and the services 164, respectively, discussed herein with respect to FIGS. 1-4.

Figure 6:
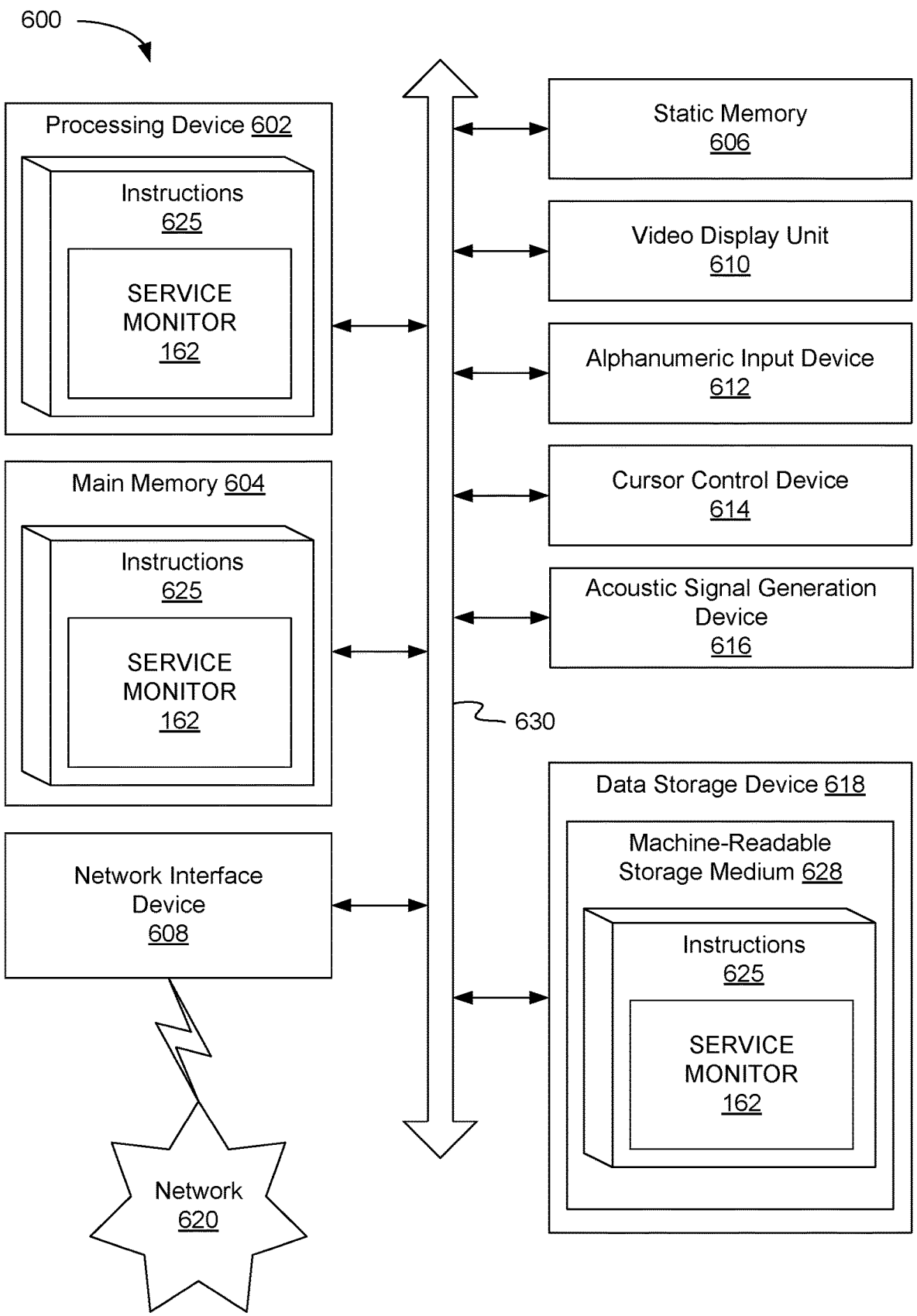
FIG. 6 is a block diagram of an example apparatus that may perform one or more of the operations described herein, in accordance with one or more aspects of the disclosure.

FIG. 6 is a block diagram of an example computing device 600 that may perform one or more of the operations described herein, in accordance with one or more aspects of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a service configuration component, e.g., service monitor 162 for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "determining," "transmitting," "performing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
receiving a status communication associated with a mesh network comprising a plurality of interconnected node devices, wherein the mesh network comprises a plurality of segments;
responsive to receiving the status communication, determining whether a configuration policy associated with services provided by the mesh network has been violated, wherein the configuration policy comprises at least one of a minimum or a maximum quantity of the plurality of interconnected node devices within a first segment of the plurality of segments to execute a second service; and
responsive to a determination that the configuration policy associated with the services provided by the mesh network has been violated, transmitting, by a processing device, a configuration communication comprising an updated configuration to a first node device of the plurality of interconnected node devices to modify the first node device from performing a first service within the mesh network to performing the second service.

2. The method of claim 1, wherein the status communication is received from an application executing on one of the plurality of interconnected node devices.

3. The method of claim 1, wherein the configuration policy comprises a minimum or maximum quantity of the plurality of interconnected node devices within the mesh network to execute the second service.

4. The method of claim 1, wherein the configuration policy comprises a ratio of the plurality of interconnected node devices within a geographic area to execute the second service.

5. The method of claim 1, wherein the configuration communication is a first configuration communication, and wherein the method further comprises:
responsive to the determination that the configuration policy of the mesh network has been violated, transmitting, by the processing device, a second configuration communication to a second node device of the plurality of interconnected node devices to modify the second node device to begin performing a third service.

6. The method of claim 1, wherein the second service comprises at least one of: an authentication service, a storage service, a gateway service, a processing service, a power management service, or a packaging service.

7. A system comprising:
a memory; and
a processing device, operatively coupled to the memory, to:
receive a status communication associated with a mesh network comprising a plurality of interconnected node devices, wherein the mesh network comprises a plurality of segments;
responsive to the reception of the status communication, determine whether a configuration policy of services provided by the mesh network has been violated, wherein the configuration policy comprises at least one of a minimum or a maximum quantity of the plurality of interconnected node devices within a first segment of the plurality of segments to execute a second service; and
responsive to a determination that the configuration policy of the services provided by the mesh network has been violated, transmit a configuration communication comprising an updated configuration to a first node device of the plurality of interconnected node devices to modify the first node device from performing a first service within the mesh network to performing the second service.

8. The system of claim 7, wherein the status communication is provided by an application executing on one of the plurality of interconnected node devices.

9. The system of claim 7, wherein the configuration policy comprises a minimum or maximum quantity of the plurality of interconnected node devices within the mesh network to execute the second service.

10. The system of claim 7, wherein the configuration policy comprises a ratio of the plurality of interconnected node devices within a geographic area to execute the second service.

11. The system of claim 7, wherein the configuration communication is a first configuration communication, and wherein the processing device is further to:
responsive to the determination that the configuration policy of the mesh network has been violated, transmit a second configuration communication to a second node device of the plurality of interconnected node devices to modify the second node device to begin performing a third service.

12. The system of claim 7, wherein the second service comprises at least one of: an authentication service, a storage service, a gateway service, a processing service, a power management service, or a packaging service.

13. A non-transitory computer-readable storage medium including instructions that, when executed by a processing device, cause the processing device to:
receive a status communication associated with a mesh network comprising a plurality of interconnected node devices, wherein the mesh network comprises a plurality of segments;
responsive to the reception of the status communication, determine whether a configuration policy of services provided by the mesh network has been violated, wherein the configuration policy comprises at least one of a minimum or a maximum quantity of the plurality of interconnected node devices within a first segment of the plurality of segments to execute a second service; and
responsive to a determination that the configuration policy of the services provided by the mesh network has been violated, transmit, by the processing device, a configuration communication comprising an updated configuration to a first node device of the plurality of interconnected node devices to modify the first node device from performing a first service within the mesh network to performing the second service.

14. The non-transitory computer-readable storage medium of claim 13, wherein the status communication is provided by an application executing on one of the plurality of interconnected node devices.

15. The non-transitory computer-readable storage medium of claim 13, wherein the configuration policy comprises a minimum or maximum quantity of the plurality of interconnected node devices within the mesh network to execute the second service.

16. The non-transitory computer-readable storage medium of claim 13, wherein the configuration policy comprises a ratio of the plurality of interconnected node devices within a geographic area to execute the second service.

17. The non-transitory computer-readable storage medium of claim 13, wherein the configuration communication is a first configuration communication, and
wherein the instructions, when executed by the processing device, cause the processing device further to:
responsive to the determination that the configuration policy of the mesh network has been violated, transmit a second configuration communication to a second node device of the plurality of interconnected node devices to modify the second node device to begin performing a third service.

18. The method of claim 1, further comprising:
monitoring movement of node devices into or out of the first segment, wherein the determination that the configuration policy of the mesh network has been violated is based on the monitored movement.

19. The system of claim 7, wherein the processing device is further to:
monitor movement of node devices into or out of the first segment, wherein the determination that the configuration policy of the mesh network has been violated is based on the monitored movement.

20. The non-transitory computer-readable storage medium of claim 13, wherein the instructions, when executed by the processing device, cause the processing device to:
monitor movement of node devices into or out of the first segment, wherein the determination that the configuration policy of the mesh network has been violated is based on the monitored movement.

* * * * *